United States Patent
Gueret et al.

(10) Patent No.: US 12,455,923 B2
(45) Date of Patent: Oct. 28, 2025

(54) INTELLIGENT COLLABORATIVE DECISION GENERATION SYSTEM WITH ITERATIVE PREDICTION OF LINK SET IN KNOWLEDGE GRAPH

(71) Applicant: Accenture Global Solutions Limited, Dublin (IE)

(72) Inventors: Christophe Gueret, Donabate (IE); Sumit Pai, Palmerstown (IE); Luca Costabello, Newbridge (IE); Rory McGrath, Kildare (IE)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 18/333,093

(22) Filed: Jun. 12, 2023

(65) Prior Publication Data
US 2023/0401258 A1    Dec. 14, 2023

Related U.S. Application Data

(60) Provisional application No. 63/351,560, filed on Jun. 13, 2022.

(51) Int. Cl.
*G06F 16/901* (2019.01)
*G06N 5/025* (2023.01)

(52) U.S. Cl.
CPC ......... *G06F 16/9024* (2019.01); *G06N 5/025* (2013.01)

(58) Field of Classification Search
CPC ........................... G06F 16/9024; G06N 5/025
See application file for complete search history.

(56) References Cited

U.S. PATENT DOCUMENTS

| | | | |
|---|---|---|---|
| 2018/0287723 A1* | 10/2018 | Musgrove | H04B 15/02 |
| 2019/0102430 A1* | 4/2019 | Wang | G06N 7/01 |
| 2019/0278777 A1* | 9/2019 | Malik | G06F 16/9024 |
| 2022/0253477 A1* | 8/2022 | Lipka | G06N 20/00 |
| 2022/0300831 A1* | 9/2022 | Friede | G06N 5/022 |

* cited by examiner

*Primary Examiner* — Tony Wu
(74) *Attorney, Agent, or Firm* — Polsinelli PC

(57) ABSTRACT

This application relates generally to intelligent and explainable link prediction in knowledge graph systems that automatically incorporate user feedback. In one aspect, this application discloses an iterative process for predicting a link set as a group of links in a knowledge graph in an embedding space by expanding the knowledge graph with predicted and validated single links in each iteration such that a final set of links are predicted with each one being added to the set depending on previously added predicted links. In another aspect, this application also discloses automatically extracting rules from user feedback of link predictions and generating a user feedback knowledge graph from the extracted rules, which in combination with an original knowledge graph are used for the generation of the link predictions.

19 Claims, 10 Drawing Sheets

INTELLIGENT COLLABORATIVE DECISION GENERATION SYSTEM WITH ITERATIVE PREDICTION OF LINK SET IN KNOWLEDGE GRAPH

CROSS REFERENCE

This application is based on and claims the benefit of priority to U.S. Provisional Patent Application No. 63/351,560, filed on Jun. 13, 2022, which is herein incorporated by reference in its entirety.

BACKGROUND

Technical Field

This application relates generally to intelligent and explainable link prediction in knowledge graph systems that automatically incorporate user feedback.

Background Technologies

Industrial production and operational processes are complex, involving components such as engineering, supply chain, sourcing, manufacturing, servicing, personnel/staff management and the like. These components interact with one another in intricate manners. Such interactions may require sophisticated knowledge base to track. Links between observable operational challenges/deficiencies and possible solutions may be embedded in such intricate relationships. Automatic discovery of such links at group or set level rather than single problem-solution level and with automagically processed user feedback may be critical for finding optimal solutions and for improving operational efficiency.

BRIEF DESCRIPTION OF THE DRAWINGS

The foregoing and other objects, features, and advantages for embodiments of the present disclosure will become apparent from the following more particular description of the embodiments as illustrated in the accompanying drawings, in which reference characters refer to the same parts throughout the various views. The drawings are not necessarily to scale, with emphasis instead being placed upon illustrating principles of the present disclosure.

DETAILED DESCRIPTION AND DRAWINGS

Figure 1:
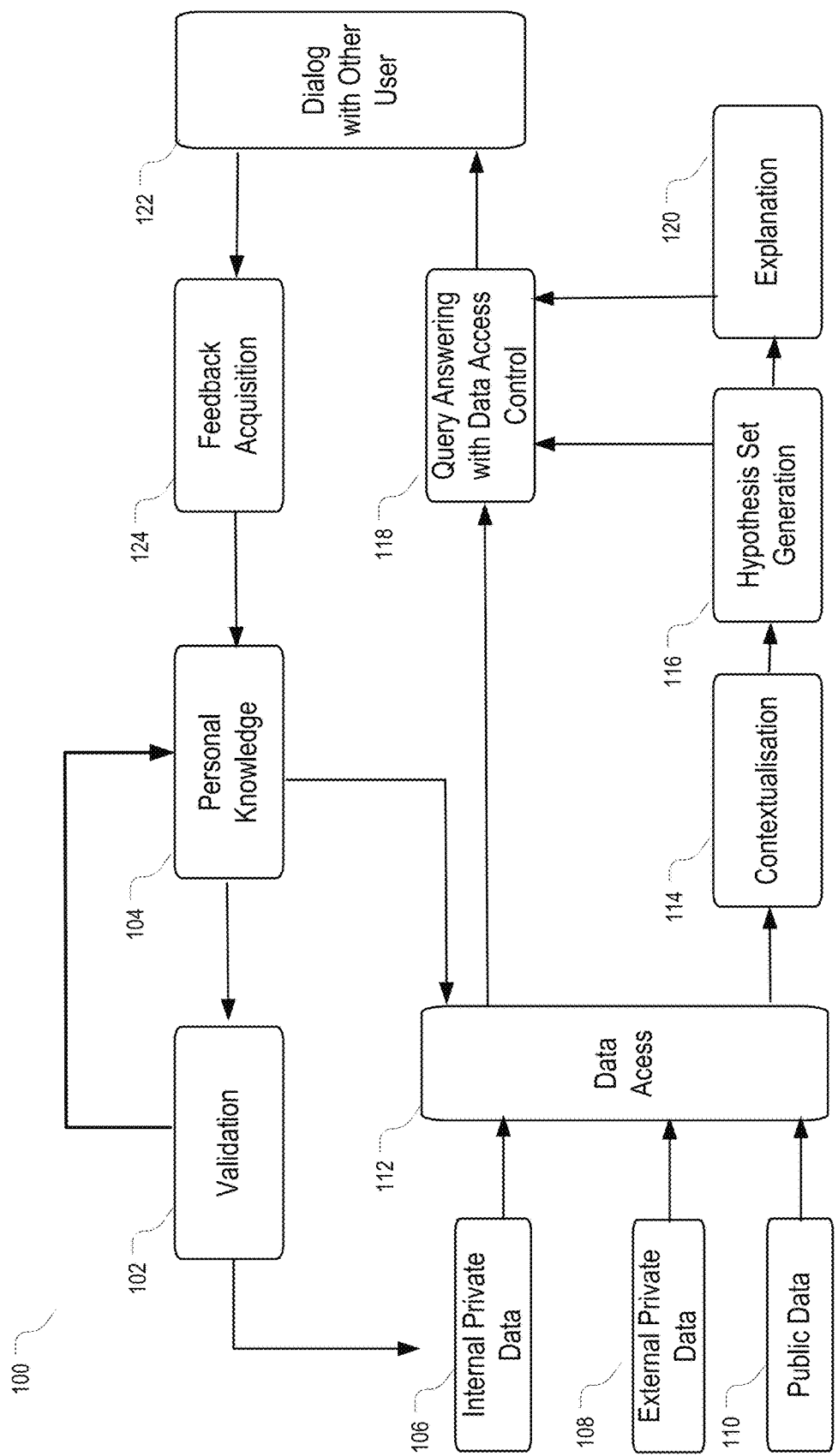
FIG. 1 illustrates an example intelligent knowledge system including link prediction.

This system will now be described in detail hereinafter with reference to the accompanied drawings, which form a part of the present disclosure, and which show, by way of illustration, various example implementations and embodiments. The system may, however, be embodied in a variety of different forms and, therefore, the disclosure herein is intended to be construed as not being limited to the embodiments set forth. Further, the disclosure may be embodied as methods, devices, components, systems, frameworks, and/or platforms. Accordingly, embodiments of the disclosure may, for example, take the form of hardware, software, firmware or any combination thereof.

In general, terminology may be understood at least in part from usage in its context. For example, terms, such as "and", "or", or "and/or," as used herein may include a variety of meanings that may depend at least in part upon the context in which such terms are used. Typically, the term "or", if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for the existence of additional factors not necessarily expressly described, again, depending at least in part on context.

By way of introduction, most industrial, enterprise, or business operations involve diverse set of domains that are related in intricate manners which are difficult to track manually. For example, industrial production operations are usually complex, involving components such as engineering, supply chain, sourcing, manufacturing, servicing, personnel/staff management and the like. These components interact in intricate manners. Industrial production and management in various technological segments have been undergoing major digital transformations, as intelligent and automatic rule-based as well as inference-based tools become available. These digital transformations may be holistically designed to maximize industrial operation and production efficiency.

In the context of industrial operations, for example, even within each of the domains, intra-domain data relationships can be sufficiently complex and domain data are no longer efficiently manageable using traditional relational database frameworks. These databases have been gradually replaced by various knowledge graphs.

Knowledge graphs are generally suitable for organizing a collection of complex data items and may be used for description of various sophisticated application scenarios including but not limited to community networks, social networks, general knowledge networks, industrial and enterprise operations, and the like. These data items may include various physical or abstract entities, concepts, numerals, and complex relationships there between. For example, a social community may be described by various interconnecting entities, concepts and numerals of various types, such as people, places, employers, entertainment venues, ethnicities, municipal agencies, health facilities, service providers, population numerals, date numerals, and the like. In an industrial operation, for another example, such interconnecting physical or abstract entities, concepts, and numerals may include but are not limited to domain processes, facilities, equipment, sensors/sensor parameters, raw materials, intermediate products, final products, key performance measures, power consumptions, emissions, and regulation compliances, supply chain entities, personnel hierarchies, accounting data items, customers, and the like. Such an industrial operation may be associated with one or more of, for example, chemical synthesis, petroleum refining, semiconductor wafer fabrication, water treatment, electric power production, and the like.

A knowledge graph may represent a collection of known facts as recorded entities, concepts, and numerals of various types, and relationships there-between. New knowledge such as hidden/missing/unknown relationships/links between the known entities and concepts, or new numeric properties of the known entities and concepts may be derived using machine learning models trained based on the known facts and their correlations in the knowledge graph, thereby expanding the existing knowledge graph.

Existing knowledge graphs may generally be siloed in that they are usually domain specific. A typical industrial operation generally includes many domains. In some situations, siloed databases or knowledge graphs may not be very useful in solving cross-domain problems. For example, many critical challenges/deficiencies in such industrial operation may be rooted in cross-domain issues which are embedded in the intricate cross-domain relationships that may not necessarily be captured by the siloed databased or knowledge graphs.

In some example implementations, a cross-domain intelligent system based on one or more underlying knowledge graphs may be developed to capture such inter-domain relationships and act as a knowledge base for automatically assisting in providing solutions to cross-domain challenges/problems of the industrial operations and other application contexts.

For example, such a knowledge system may act as a digital version of a human "consultant", who may be capable of intaking various domain information, converting the information into trackable and organized historical knowledge, performing inference based on such knowledge, and generating solutions to cross-domain operational challenges, problems, and/or deficiencies.

Such an intelligent knowledge system, for example, may participate in projects and meetings in different domains and teams in an industrial, enterprise, or business operation to gather information and to update its knowledge base, and may be supplied with additional data for expanding its knowledge base. For example, domain specific knowledge base may be ingested and harmonized to reduce data silos and to form a holistic knowledgebase rather than scattered and siloed knowledgebases. The additional data and information that are gathered by the example knowledge system may include but are not limited to information about the performance of some operational approaches (e.g. inclusion of artificial Intelligence (AI), edge intelligence, 3D printing, and the like in the operation), and data expert information (e.g., Machine learning model developers, DevOps experts, engineers, and the like).

In particular, such a knowledge system may be developed to leverage intra and inter domain knowledge in order to identify collective and optimized solutions across various domains for solving some observed operational challenges/deficiencies. Such cross-domain knowledge system is critical because these industrial challenges/deficiencies may be related to many underlying interconnected causes with complex dependencies that are very difficult to manually identify and track.

Example observable or derivable industrial operation challenges/deficiencies may include but are limited to, for example:
  Low production efficiency;
  Excessive development cycles; and/or
  Lack of adherence to specifications.

Potential solutions that may contribute to improving one or more these example problems may include, but are not limited to cross-domain deployment actions such as:
  Deploying cloud-based flow data analytics;
  Installation of IoT devices on the supply chain;
  Outsourcing of supply chain bottle necks; and/or
  Technical upgrade for bottle necks.

Links between these challenges and solutions may be derived by analyzing the underlying knowledge graphs that may include information from various domains in which such links are implicitly embedded. In the various example implementations below, an Artificial Intelligence (AI) system may be developed and trained to discover link any observed set of operational deficiencies to a set of cross-domain solutions/actions. The goal of such an explainable AI knowledge system may be to perform a data integration from the different data silos (different domains) and perform automatic prediction and reasoning over a knowledge graph based on input observables (e.g., operational challenges/deficiencies). A hybrid intelligence context may be relied on where the knowledge system is expected to learn from the interaction with the humans as it works with them and participate in various projects. This particular context is selected as an example application because of its increased chance of cross-domain and/or cross-team knowledge sharing: the example explainable AI knowledge system may join more teams than any other human consultant will. This represents a great opportunity to spread knowledge more widely across the domains and can only happen if the machines have acquired some of the collective expertise of teams. It could well happen that by working in different teams an otherwise unexpected association between a given set of solutions and a given set of challenges or observed deficiencies would emerge from being practically working in different contexts.

Auch an AI system, just like its human counterpart, may be expected to:
  Contribute to the collective generation of the Solution-Challenge set of links by formulating suggestions for such links;
  Explain the reasoning behind those suggestions;
  Listen to peers for feedback and argumentation over their own suggestions; and
  Over time, capitalize over this accumulated knowledge and share back some insights.

Such a knowledge system may be deployed for a wide range of contexts. A base system may be developed as an industry or context agnostic platform, which may then be ingested, self-expanded, and self-adapted to specific operational settings and become a cross-domain intelligent digital expert.

Very importantly, the derivation of solutions to operational challenges/deficiencies by the example intelligent knowledge system may be performed by considering such solutions and challenges/deficiencies at a group level, rather than at an individual problem-solution level, by leveraging the various cross-domain knowledge. Solutions may be provided by the example knowledge system as an optimized minimal set that capture the most important causational relationships embedded in the underlying cross-domain knowledge graphs.

An example logic and data flow for such an explainable AI knowledge system 100 is illustrated in FIG. 1. The explainable AI knowledge system 100 may include a data access circuitry 112 for data intake, including intaking data for internal private data source 106, external private data source 108 (with proper data access privileges), and various public data source 110. These data sources may include, for example, various domain specific knowledge bases in various forms, including in the form of knowledge graph. Very importantly, the data access circuitry 112 may also access personal knowledge 104 of the explainable AI knowledge system 100. The personal knowledge 104 may be accumulated and stored as a knowledge graph. The term "personal" is used indicate that such knowledge is accumulated, extracted, and maintained with the explainable AI knowledge system 100. The personal knowledge 104, for example, may capture various cross domain relationships. The personal knowledge may be validated via the validate circuitry 102 and may be further provided to the various data sources 106, 108, and 110 for improving the scope of these data sources.

As a key component of the explainable AI knowledge system 100, the query answering circuitry 118 may be configured to process relevant external and internal data and to perform the various link predication and solution identification for the various industrial operational challenges/deficiencies described above. The datasets derived by the data access circuitry 112 may be contextualized by the contextualization circuitry 114 and may then be used to generate hypothetical knowledge links as candidate link predictions for the query answering circuitry 118. The explanation circuitry may be configured to generate explanation for the link hypothesis and predictions, which may be passed along together with the predicted links and solutions to a user by the query answering circuitry 118 via a user dialog interface 122. The user may review the generated links and solutions and provide feedback to the explainable AI knowledge system 100 via the feedback acquisition circuitry 124. The predicted links, solutions may then be used to modify, expand, and improve the personal knowledge 104 in view of the user feedback.

The example explainable AI knowledge system 100 above may thus be trained and configured to compose or create a set of links during a link prediction task rather than creating a path (such as what some of the existing implementations do). This example system is thus capable of considering a set of such links as a solution and optimizing such a solution rather than considering only single links.

In the context of finding optimal solutions to industrial operational deficiencies or challenges, the example explainable AI knowledge system 100 above is mainly responsible for predicting a set of links that are explainable and that may be further processed via a user (expert) feedback process. The various example implementation below focus on the link prediction aspect and user feedback aspect of the example explainable AI knowledge system 100.

Figure 2:
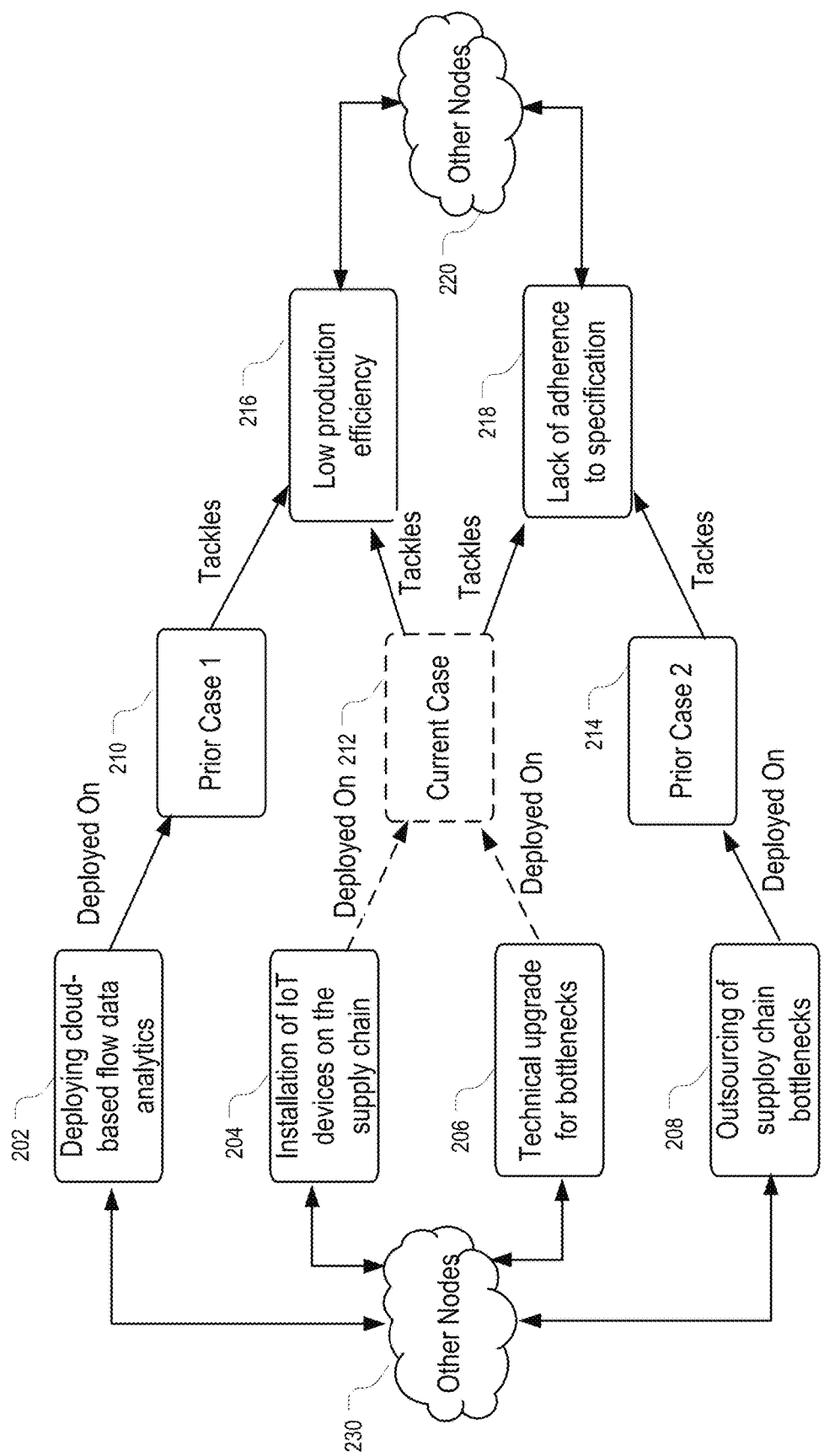
FIG. 2 illustrates an example knowledge graph for identifying solutions for observed deficiencies in an industrial operation.

FIG. 2 provides an illustrative example context for link prediction and user feedback in the context of generating solutions to industrial operational deficiencies or challenges at group or set level (rather than single isolated problem-solution links). The link prediction task for the explainable AI system 100 is to predict a set of links that connects industrial operational challenges/deficiencies with a group of solutions/actions. These solutions/actions may be cross-domain as the explainable AI system 100 is configured to identify both inter and intra domain knowledge in predicting the set of links.

To address this problem of supporting the creation of such links, a knowledge graph and a graph machine learning approach of Link recommendation based on historical solutions to challenges may be used. As illustrated in FIG. 2, various example operational solutions/challenges may include:

Deploying cloud-based flow data analytics (202);
Installation of IoT (Internet-of-Things) devices on the supply chain (204);
Outsourcing of supply chain bottlenecks (208); and/or
Technical upgrade for bottlenecks (206).

According to historical knowledge possessed by the system, it is assumed that the system is aware that in a prior link prediction task shown as prior case 1 (210), the solution/action 202 (Deploying cloud-based flow data analytics) has been known as a solution to deal with low production efficiency 216 as a challenge or operational deficiency. Likewise, it is assumed that the system is aware that in a prior link prediction task shown as prior case 2 (214), the solution/action 208 (outsourcing of supply chain bottlenecks) has been known as a solution to deal with a lack of adherence to specification (218) as a challenge or operational deficiency.

It is further assumed that in a current link prediction case 212, the example explainable AI knowledge system 100 is tasked to identify a set of solutions to the set of challenge (operational deficiencies) including both low production efficiency 216 and lack of adherence to specification 218. The example explainable AI knowledge system 100 is then configured to go beyond merely individually linking solution 202 to one of the challenges, 216, and linking solution 208 to the challenge 218, which were know from previous predictions, and to identify links by considering the challenges and solutions as sets when leverage embedded group-level correlations in the knowledge bases.

For example, the explainable AI knowledge system 100 may predict that the combination of low production efficiency and lack of adherence to specification together is actually more indicative of a problem that may be solved by combining solution 204 and 206 (Installation of IoT (Internet-of-Things) devices on the supply chain, and technical upgrade for bottlenecks). The predicted links thus connect Installation of IoT devices on the supply chain (204) and Technical upgrade for bottlenecks (206) as the combined solutions to the challenges of Low production efficiency and Lack of adherence to specifications. These connections are shown as the dashed arrows in FIG. 2. It is important to note here that the prediction solutions and links come as a set. For example, performing the technical upgrade for the bottlenecks implies knowing where these bottlenecks are. This is possible thanks to the deployments of IoT on the supply chain. So even if doing such deployment per se does not tackle the challenge, it is a necessary link to have as part of the solution set.

If the task were to be left for manual derivation, human consultants need to figure out what makes the most sense in the specific context of this particular supply chain, considering all the information available about it and knowledge bases made of information from prior projects. Some of the correlations may be hidden and difficult to extract.

The various background knowledge is hereafter represented as clouds of "other nodes", as indicated by 220 and 230 of FIG. 2. Such knowledge may include links to other concepts and entities in the knowledge graph generated and maintained by the example explainable AI knowledge system 100 of FIG. 1. For example, such knowledge may include the domain knowledge and cross-domain knowledge as generated and maintained by the example explainable AI knowledge system 100 of FIG. 1 as well as data and knowledge accessible from the various internal and external data sources 106, 108, and 110 of FIG. 1.

Application of the knowledge system of FIG. 1 to the industrial operation scenario of FIG. 2 is merely one example. Such a system may be used in various other contexts. To provide another example and to make a quick parallel analogy in the medical domain, such a set of solutions may be referred to as a "regimen" including a set of treatments, which, when considered as a whole, constitute an approach to tackle one particular ailment or a combination of ailments. As such, in the medical context, the explainable AI knowledge system 100 of FIG. 1 would be configured to find "regimen" nodes instead of "use-case" nodes to connect medications/treatments (solutions) to diseases (challenges) at a set of group level.

In some example implementations in various contexts, the example explainable AI knowledge system 100 of FIG. 1 may be configured and trained to deal with at least the following example questions, which are addressed in the detailed implementations below:

How can the explainable AI knowledge system formulate a set of hypothesis and explain the reasoning behind the composition of this set?

How can the explainable AI knowledge system gather feedback about its suggestions and the reasoning process behind that of others?

In some example implementations, the explainable AI knowledge system 100 may be configured to identify link set under the consideration that:

There is no explicit modelling of dependencies informing that a particular solution would depend on another one. There is instead, via the use-case nodes (as shown in FIG. 2), statistical correlation showing that some combinations happen to be deployed more often than others;

The set should correspond to the minimum size of the combination of solutions (optimization) while there is not defined target set size;

The reasoning behind the combinatorial optimization process should be transparent and explainable to the user.

Traditional body of work on link prediction includes, for example, Complex Query Answering with Neural Link Predictors, and the like. These traditional link prediction approaches lack the notion of a challenge and solution sets emphasized above. Example neural theorem approaches configured to answer complex queries nevertheless focus on finding paths in knowledge graphs rather than the sets of links as emphasized above.

In terms of explanations of the link prediction, the traditional ranking of the predicted links in a single link prediction strategy may be relied on. There is also a body of work around finding parts of the graph key to a given prediction. However, those approaches focus on explaining a particular single link prediction. They do not work as is to explain a set of links, nor to explain process behind an incremental composition of that set.

Link Prediction as a Link Set

Figure 3:
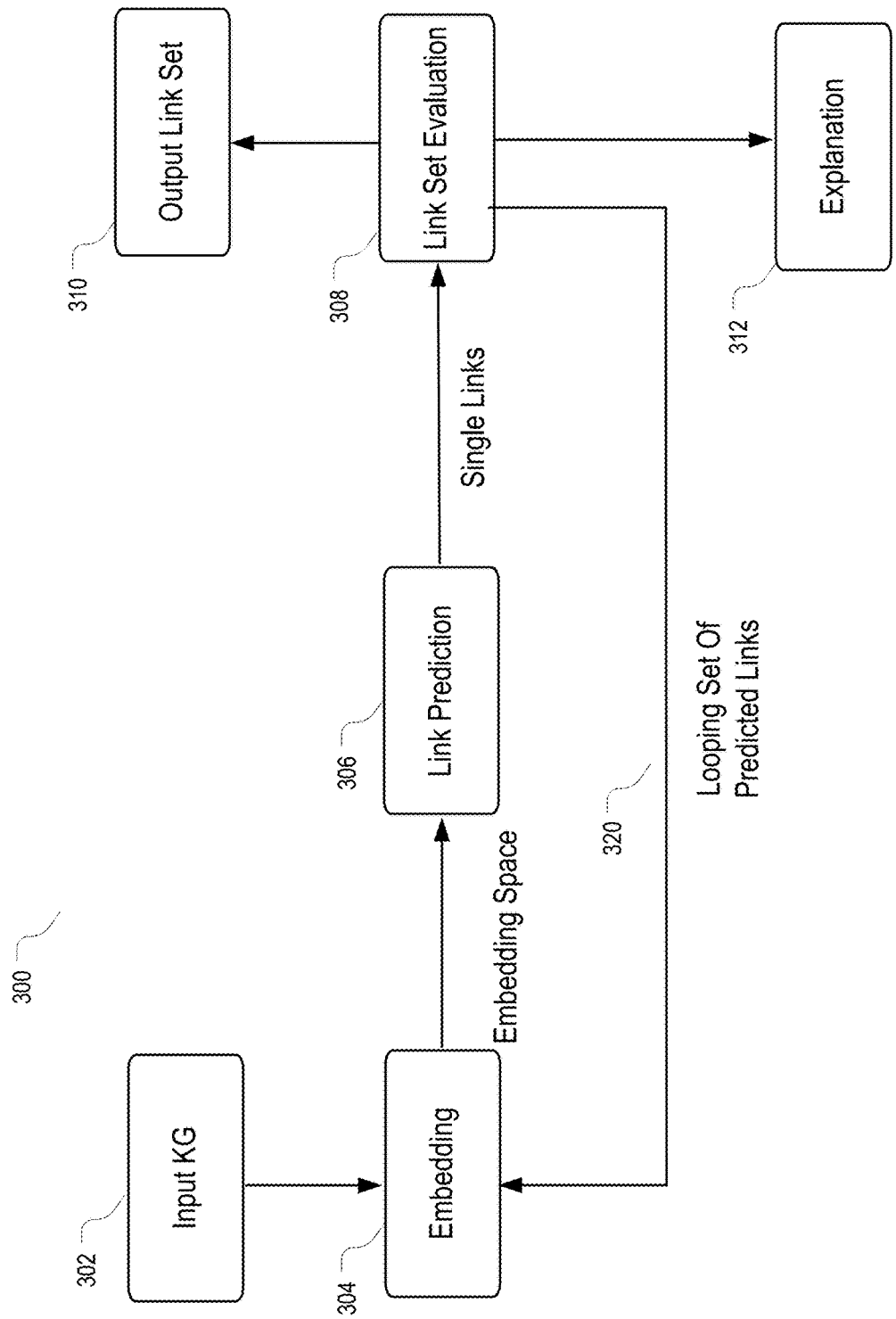
FIG. 3 illustrates an example explainable link prediction, evaluation system.

FIG. 3 shows an example link set prediction system 300 that may be used as part of the explainable AI knowledge system 100 of FIG. 1. The example link set prediction system 300 takes as an input a Knowledge Graph (KG) 302. The KG 302 may be converted into a trained embedding space by an embedding circuitry 304. For example, the embedding circuitry may be based on any embedding approaches such as ComplEx. The embedding space may be train based on the knowledge graph. The various nodes and edges of the KG 302 may be transformed into a vectors of multiple dimensions in the trained embedding space.

As further shown in FIG. 3, this embedding space may then be used via a link prediction circuitry 306 to first predict single links via a process of, for example, hypothesis testing. Such hypothesis testing process, for example, may involve trying out all the possible instances of solutions that could match the given use case. The outcome of this process are single predicted links (where the links are not considered as a set yet). The predicted single links may then be processed by a link set evaluation circuitry 308 to determine whether the links may be added to the link set under construction and whether the current link set is viable as is or it is worth looking for extending it. In case of un-satisfactory link set, the current set of links may be sent back to the embedding circuitry 304 and the flow of FIG. 3 repeats, as shown by the looping arrow 320. Otherwise, if the link set is satisfactory, the link set may be sent to the user as an output link set 310, and also sent to the explanation circuitry 312 for augmenting the output link set by automatically generating explanation for the predicted link set.

Various components of FIG. 3 are described in further detail below.

Figure 4:
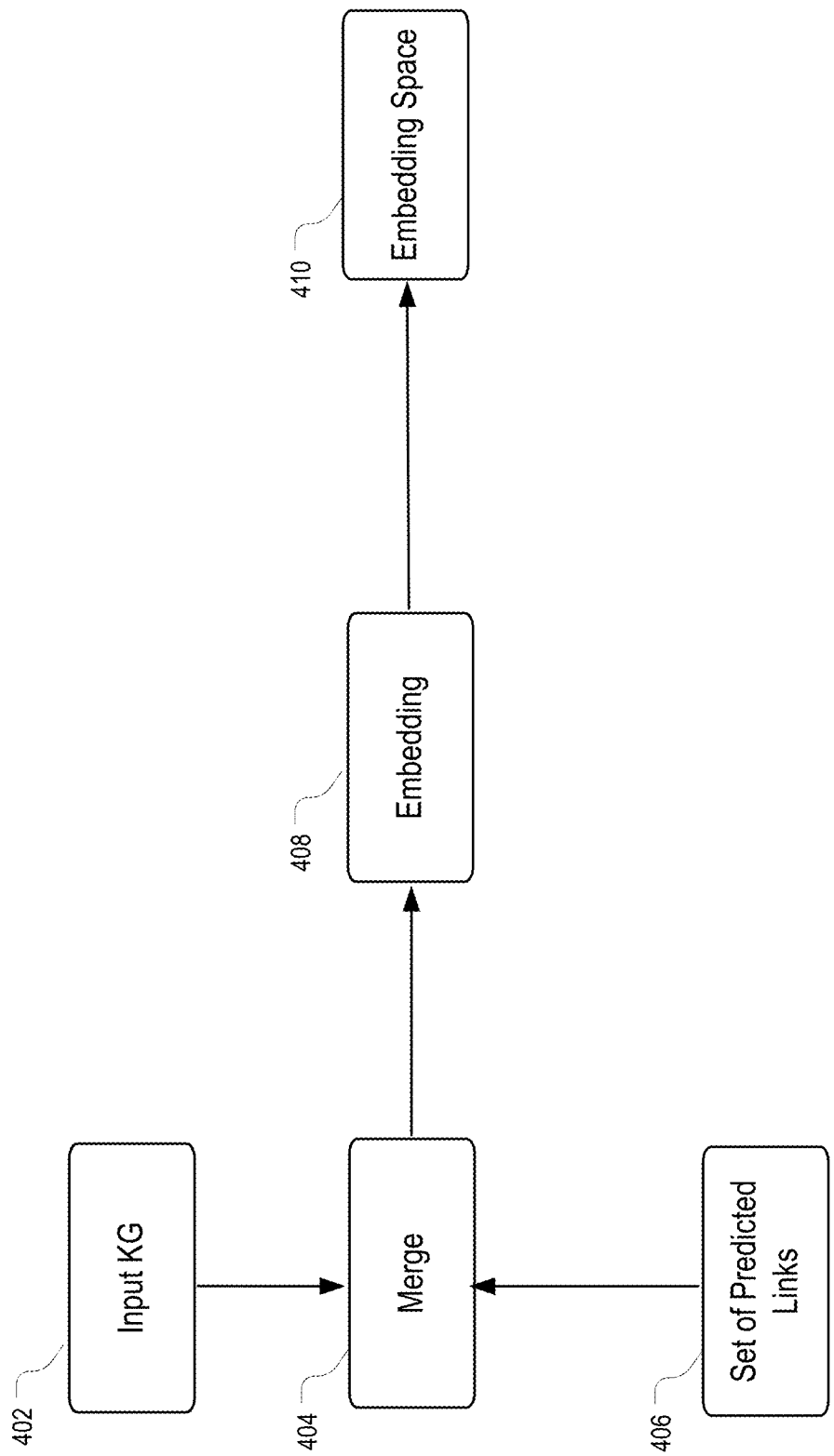
FIG. 4 illustrates an example embeddings generation subsystem of the link prediction and evaluation system of FIG. 3.

FIG. 4 illustrates additional detail with respect to the operation of the embedding circuitry 304 of FIG. 3. The embedding circuitry transforms a set of node and edges of the input KG 402 into multidimensional vectors in the embedding space 410. Example implementations such as Ampligraph.org may be leveraged at this stage. The traditional embedding approaches may be modified such that the input of the process is made of the current set of predicted links in additional to the input knowledge graph 402. In other words, the current set of predicted links (as shown by the looping arrow 320 of FIG. 3) may be added or merged to the KG 302 by the merge circuitry 404 when generating the embedding vectors for the nodes and edges of the KG by the embedding circuitry 408.

Because the set of prediction links is being generated and/or added during the link prediction process, it may be an empty set initially. In other words, at the beginning of the link set construction loop (as indicated by the looping arrow 320 of FIG. 3), the content of the input predicted link set 406 to the merge circuity 404 may be empty. Over time (after one or more loops of link set building, for example) the predicted link set to be added for the derivation of the embedding space and embedding vectors may grow in size.

At least one benefit for adding the content of the predicted link set as it is being composed in the looping process of FIG. 3 is to leverage an additive value. By including the predicted link set as it is being constructed, the initial state at the beginning of the entire reasoning process (e.g., "the business already has an IoT solution in place, what comes next?") as well as the incremental process (e.g., "let's assume an IoT solution is deployed, what comes next?") would be taken into consideration in the link construction process.

Figure 5:
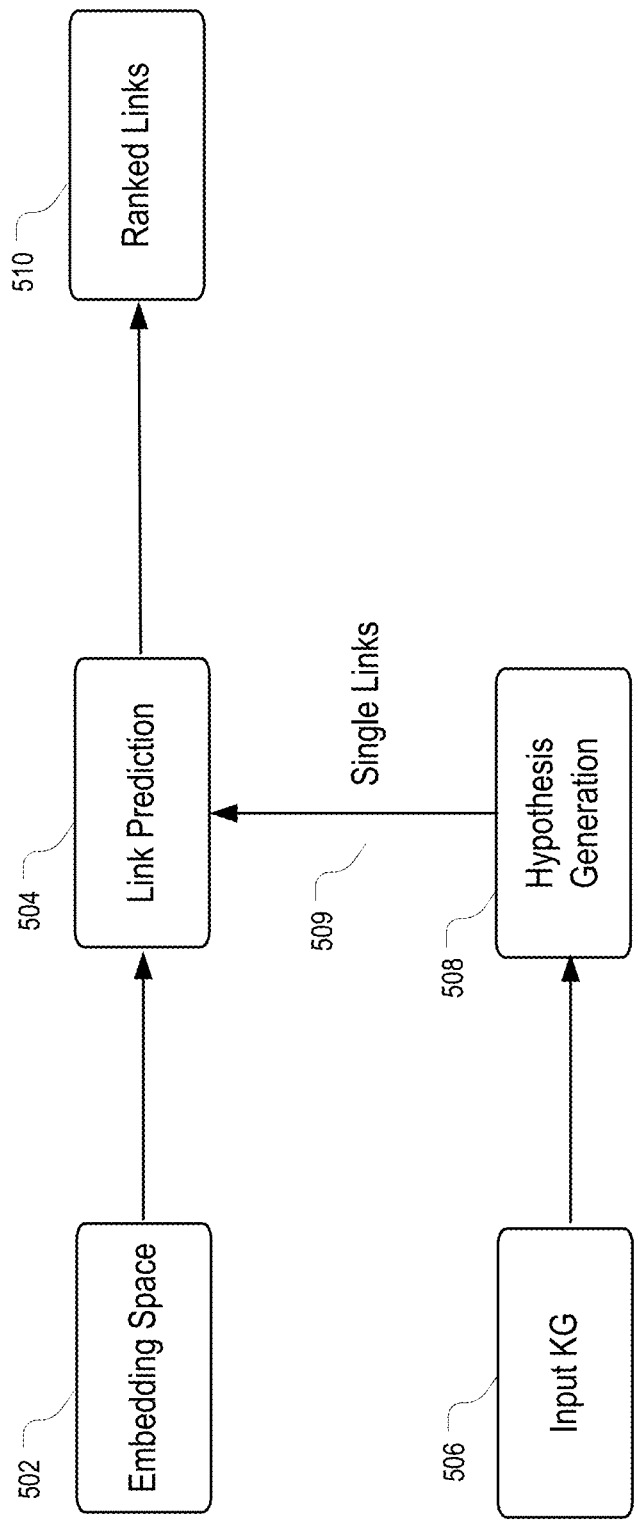
FIG. 5 illustrates an example link generation and ranking subsystem of the link prediction and evaluation system of FIG. 3.

FIG. 5 further illustrates details of the example link prediction circuitry 306 of FIG. 3. As shown in FIG. 5, in some example implementations, the embedding space 502 including the embedding vectors of the various nodes and edges of the knowledge graph may be processed by a link prediction task 504. The input to the link prediction task 504 may also include a set of links 509 to try out. In some example implementations, to compose those try-out links, all the possible pairing between solution and use-case may be considered and evaluated, without being limited to existing examples of such links in the knowledge graph (which would only allow testing as to whether a solution deployed on a given historically use case could work again in this context) to allow for experimenting more and suggesting potential new pairings. The counterpart of this approach may be a risk of exploring too much and generating non sensical results. However, that risk may be counterbalanced using an approach that takes human feedback into account to fine tune the machine learning approach and decrease the risk of generating such non sensical links, as described in further detail below.

The link prediction task 504 may be configured to output only a set of links along with a score for each returned link. The set of output links may be ranked according to the scores, and as shown by 510. If the link prediction has been calibrated the score may be provided in the form of a probability between 0 and 1, indicating a likelihood of the link being true. Otherwise the score is re-scaled on a 0-1 scale, for example, with 1 being equivalent to the score of the highest ranked triple, in order to be able to compare the values on a uniform scale.

Figure 6:
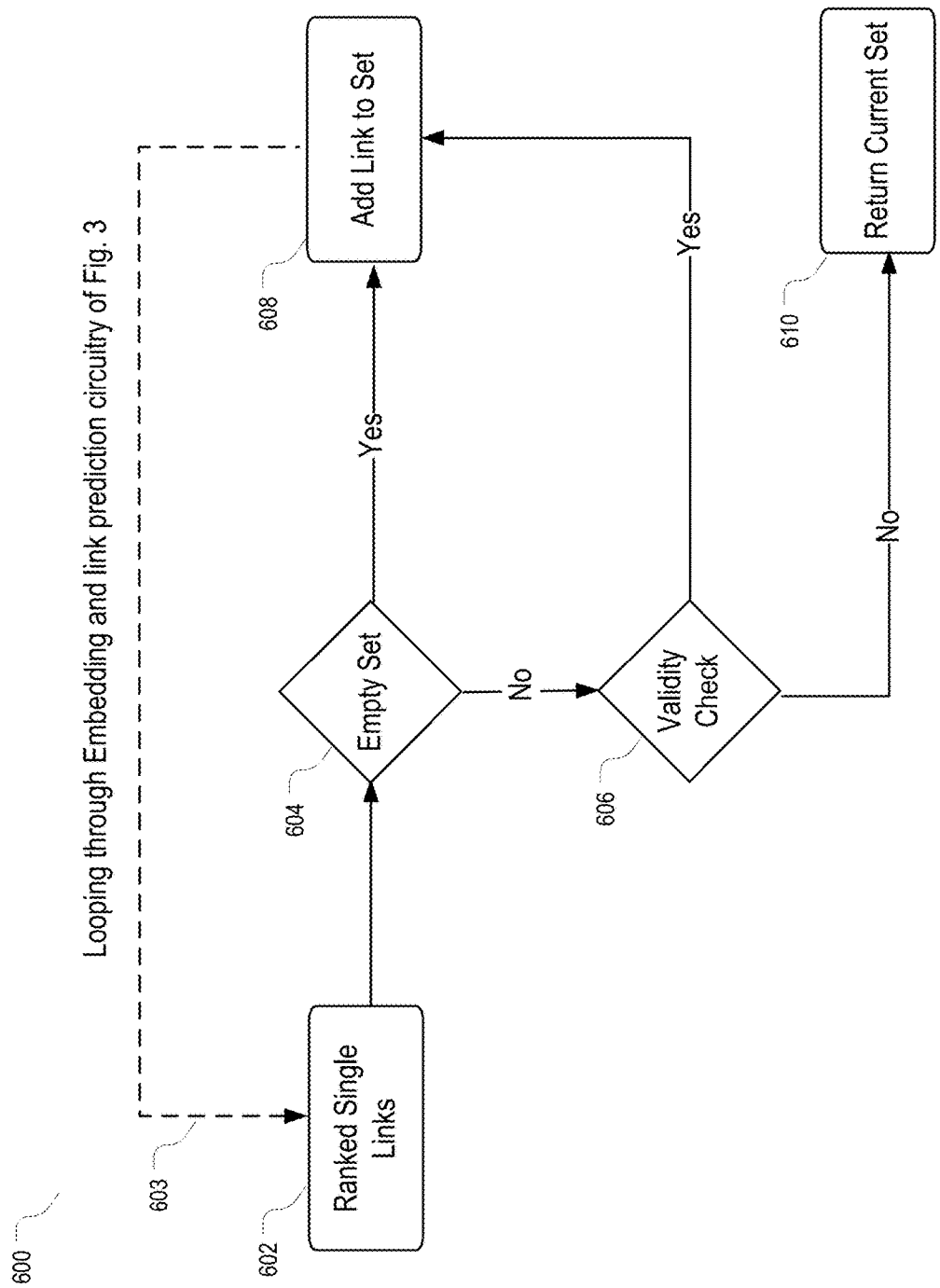
FIG. 6 illustrates an example link evaluation subsystem of the link prediction and evaluation system of FIG. 3.

FIG. 6 further shows an example implementation 600 of the link evaluation circuitry 308 of FIG. 3. Link evaluation process receives the ranked single links 602 from the link prediction task 504 of FIG. 5, and determines whether a link from the ranked single links 602 should be added to the link set to be identified. As described above, the single links in 602 are ranked with scores between, for example, 0 and 1, with 0 being given to the link least likely to be true and 1 for the most plausible one. In some implementations, those scores may not be used directly as probabilities and only their relative values (e.g., a 0.4 score is twice as likely as a score of 0.2) are focused on.

The link evaluation implementation 600 may be configured to aim at assembling a link set by iteratively adding a top-ranked link from the single link list 602 while reflecting on what has been added so far. If a predefined or adaptively developed criterion for adding a new link to the link set in construction is satisfied, this link is then added to the link set and the process loops back to the embedding generation and link generation (as shown by the looping arrows 603 of FIG. 6 and 320 of FIG. 3) to generate a new list of ranked single predicted links and again see if more links can be added to the link set in construction. Otherwise, if the predefined or adaptively developed criterion is not satisfied, suggesting that no more links could be meaningfully added to the link set under construction, the link set as constructed so far during the iterations may then be returned as an output predicted link set 310. The approach of FIG. 3 thus does not simply add a predefined or adaptively defined number of high ranked single links in one ranked link list 602 to the link set under construction. It instead emphasizes the concept of set level link construction by adding a predicted link back into the knowledge graph for an updated embedding generation and single link list prediction such that the links in the link set under construction is iteratively added by taking into consideration the already added links when determining a next link to be added to the link set under construction.

In some example implementations, the top ranked link is added to the set in each iteration:
  if the link set under construction is empty (e.g., the current iteration is still the initial iteration and no link has been added to the link set under construction), and/or
  if the link set under construction is not empty but the score of the first link in the ranked single link list 602 is sufficiently different compared to that of the few next entries. For example, the top link is only added to the link set under construction if the second ranked link in the ranked link list scores higher than a predefined percentage (e.g., 50%) of the top ranked link.

In some example implementations, this second criteria above may be tuned per use-case. The expectation of the iteration process above is that at some point the criterion will not be satisfied and the looping process will stop naturally when the machine begins to lose confidence into adding any more link to the set.

Specifically, as shown in FIG. 6, the evaluation of whether the link set to be constructed is empty occurs at 604. If the link set under construction is indeed empty, then the top ranked link from the ranked single link list 602 is added to the link set under construction, as shown by 608. Otherwise, the process 600 evaluate, at 606. the predefined or adaptive criterion for whether to add the top ranked link in the ranked single link list 602 to the link set under construction. If the determination at 606 is positive, then the top ranked link is added to the link set under construction, as shown by the "yes" branch from 606 to 608, at which point a next iteration to add a next link the link set under construction begins, as indicated by the looping arrow 603. If it is determined at 606 that the criterion to add the top ranked link from the ranked link list 602 is not satisfied, then the iteration process ends and the current set of links already added form the set of predicted links, as shown by 610.

In some example implementations, the size of the link set under constructions may be limited to a predefined number or an adaptively determined number. Once the number of already-added links in the link set under construction is above or at a maximum link set size, the iteration process of 600 may stop.

In some other example implementations, the entire process of 600 could be dispatched into parallel investigations in order to provide multiple output predicted link sets. In that scenario, for example, the second-best link in an initial ranked single link list 602 may be selected to initiate a parallel construction of an alternative link set and the rest of the procedure in the parallel construction process may follow as outlined above.

The iteration process above may be further logged in order to facilitate the explanation circuitry 312 of FIG. 3 to generate a textual output for explaining the added links in the link set. For example, the explanation circuitry 312 of FIG. 3 may take as an input the output of the link set prediction and generation process of FIGS. 3 and 6, and may be configured to determine an evolution of the content of the final predicted link set. In its basic implementation, the explanation circuitry 312 may analyze a log for predicting the links and automatically convert the log entries for a predicted link in the link set into a plain text equivalent.

For instance, an example plain text as generated by the explanation circuitry 312 may be "It seems you could add Installation of IoT devices on the supply chain and then Technical upgrade for bottle necks as the next sound solution. No more solution seems to be relevant for the use-case." For another example, a more elaborated implementation could leverage counterfactual explanation or graph-based explanation techniques to further elaborate on the thought process.

Acquisition and Usage of Human Feedback in Data Mesh AI Pipeline

Further example implementations below relate to gathering feedback in a human-machine collaboration context, such as the context shown in FIG. 1, where the explainable AI knowledge system 100 may act as a machine version of an expert or consultant and interact with human and other machines. Using human feedback to facilitate the knowledge accumulation of the explainable AI knowledge system 100 may be important particularly when there is little training data available to train the AI knowledge system 100, but experts are around to assess its prediction outcomes. This would fit the context of human-machine collaboration, as human expert, across various domains, are readily available in such collaborative settings and contexts. With such feedback, a system leveraging background data, background knowledge, and knowledge of human expert for better predictions may then be generated, delivered, and deployed.

The various additional example implementations below are thus designed to tackle the challenges associated with gathering human feedback in data mesh AI. It takes as an input indication of the reasoning behind a human judgement and incorporate the input and the indication into a data mapping/analysis pipeline. Herein, the term data mesh is used to refer to a solution architecture for the specific goal of building operation-focused data products. It is a natural evolution from a development of data fabric, and packaging the data fabric together along with AI in order to deliver AI systems to facilitate various operations and product development. Data Fabrics form a basis for a data mesh and are the pillar of modern data integration platforms and backends of AI tools. Oftentimes data fabrics leverage knowledge graphs in order to handle diverse datasets with intricate relationships, as described above.

In the context of the explainable intelligence AI system 100 introduced above in FIG. 1, the components or subsystems involving human feedback include, for example, the user dialog interface functions 122, the feedback acquisition circuitry 124, the personal knowledge generation and management circuitry 104, and the validation circuitry 102.

The term "feedback" may be understood as any kind of comment the user consuming the output of the explainable AI knowledge system 100 and part of the rest of its architecture, may produce/provide. In the various example implementations below, it is assumed that a user is provided with a set of links as predicted by the explainable AI knowledge system 100 between two entities (e.g. the links in dashed line in the example setting of FIG. 2) as well as an explanation as generated by the explanation circuitry, such as 120 of FIG. 1 and 320 of FIG. 3.

In the example context of FIGS. 1 and 3, the user feedback may be expected to include and not to be limited by the following elements:
An indication of a link being wrongly assessed and added;
An explanation, from the user, as to why this link is wrongly added to the predicted link set.

The example implementations below are provided using similar context with respect to FIG. 2 in terms of what the explainable AI knowledge system 100 of FIG. 1 is configured to perform. specifically, it is assumed that the explainable AI knowledge system 100 of FIG. 1 has returned the set of solutions 204 ("installation of IoT devices on the supply chain") and 206 ("technical upgrade for bottlenecks") for tackling the challenge or deficiency of "low production efficiency: and "lack of adherence to specification." It is also assumed that the human feedback is that "linking Installation of IoT devices on the supply chain to the current use case is wrong as the company is too small to undergo such transformation." It is thus further assumed that an external module is able to extract the following structured information:
Faulty link <Installation of IoT devices on the supply chain, deployed on, current case>
Cause of the error <Company, has size, "small">
With "Company" being the name of the company currently under consideration and "Size" its size. It is assumed that both nodes can be found in the underlying knowledge graph.

The human feedback processing may focus on connecting the end user and the infrastructure behind the data product. In other words, the question is how can human feedback be taken into consideration in KG-based data mesh AI pipelines. An architecture that takes human feedback into consideration would enable more accurate predictions from explainable AI system 100 and a feedback loop supporting collaboration among humans and between humans and the machine. The various example implementations below cater feedback on the AI part as well as the entire data mesh supported by underlying knowledge graphs.

As dealt with in the various example implementations below, some specific sub-problems with respect to human feedback include and are not limited to:
How to capture graph-centric feedback on a machine learning prediction based on graph data?
How to abstract from a single point of feedback and derive a consensus?
How to leverage a consensus into a practical insight for the data mesh?

Traditional active learning such as CDALT and other active learning approaches are aimed at taking into consideration the feedback of users to improve the AI over time. However, such traditional approaches are geared towards having a human in the loop in order to create an annotated dataset. This is mostly suitable for deep learning on textual information and has a limited applicability to structured data as used in the application context described above. For these use-cases, rule-based approaches to human feedback may be more applicable.

Other historical approaches of expert systems typically include a knowledge base and an inference engine. Although the feedback from the user could be considered as a part of the knowledge base and the link prediction may be considered as a component of an inference engine, there may be a major difference in the role and importance of the feedback rules. Expert systems usually assume that experts will state the rules composing the knowledge base whereas the implementations herein assume that a different information is used to provide insights to the users.

The various example implementations below for feedback incorporates confidences/numeric attributes of knowledge graph triples into consideration while training the feedback model. As shown in further detail below, it introduces a plug-in layer in between the loss and the scoring layer of the traditional architecture. This plug-in layer processes the numeric attribute/confidence associated with the input triples and focuses the model on triples of high confidence by altering the margin between the scores of true and corrupted triples, thereby altering/tuning the loss.

In these example implementations, the problems identified above may be solved by:
Capturing graph-centric feedback on a machine learning prediction based on graph data by:
a tool that presents the user with an explanation outlining the parts of the graph leading to the prediction; and
using user comments on the prediction and the reasoning associated with it.
Abstracting from a single point of feedback and deriving a consensus by:
a tool that captures the single data point feedback and converts it into a logical rule, thereby enabling the creation of more data points from it.
Leveraging a consensus into a practical insight for the data mesh by:
a tool that reasons over the compatibility of the rules output and the ground truth data. Compatible insights are adopted whereas incompatible ones are flagged out for correction in the data mesh.

Figure 7:
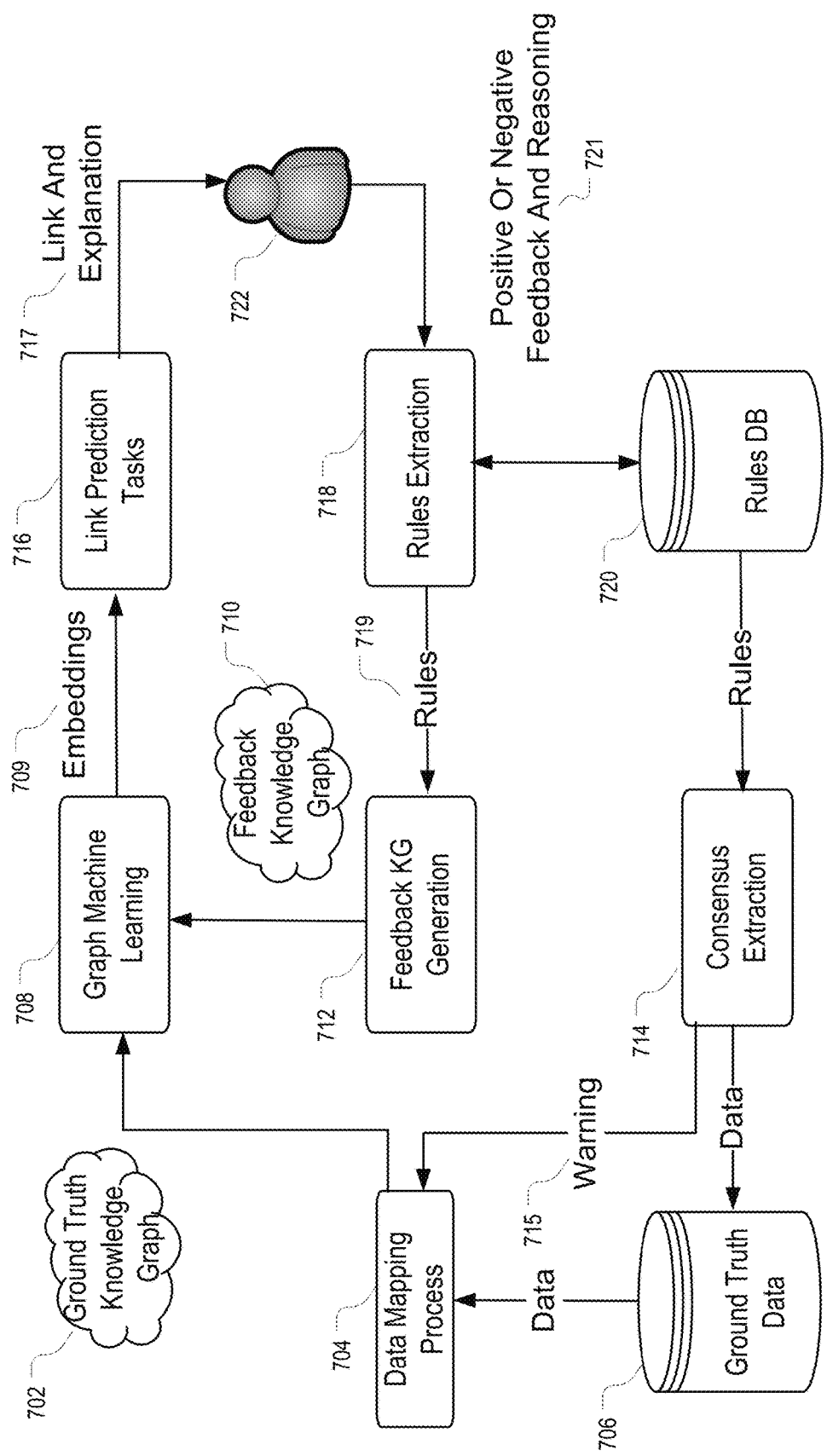
FIG. 7 illustrates an example graph machine learning system that incorporate user feedback as part of the learning process.

The example implementations below receive and process an input knowledge graph and provide as an output a prediction for a new link or new link set in that graph. An example data and logic flow is shown by 700 of FIG. 7. As shown in FIG. 7, this prediction is made using a graph machine learning approach solving a link prediction task, as depicted by the two blocks or circuitry "Graph machine learning" 708 and "Link prediction" 716. These two blocks perform the functions of, for example, the embedding circuitry 304, the link prediction circuitry 306, and the link evaluation circuitry 308 of FIG. 3.

In particular, the graph machine learning circuitry 708 may process input knowledge graph (such as 702) to generate embeddings 709 of the knowledge graph nodes and edges, which may be provided to the link Prediction tasks 716 for generating predicted links and explanation for the predicted links 717. The predicted links and explanation 717 may then be provided to a user 722 via an appropriate user interface. Feedback 721 (either positive or negative) from the user 722 may then be provided to a rule extraction circuitry 718 which generates rules 719 and/or fetches and extract relevant rules 719 from the rules database 720. The extracted rules 719 may then be provided to a feedback knowledge graph generation circuitry 712 for generating or updating a feedback knowledge graph 710. The feedback knowledge graph 710 may be further provided to the graph machine learning circuitry 708 as another input in the generation of embeddings 709.

As further shown in the example data and logic flow 700 of FIG. 7, a consensus extraction circuitry 714 may be included and configured to extract relevant rules from the rules database 720 to generate ground truth data for storage in a ground truth data database 706 and for generating warning signal 715 when detecting discrepancy between the consensus and the generated ground truth data. The generated ground truth data may be converted to knowledge graph by the data mapping process 704. The resulting knowledge graph may be provided to the graph machine learning circuitry 708.

Figure 8:
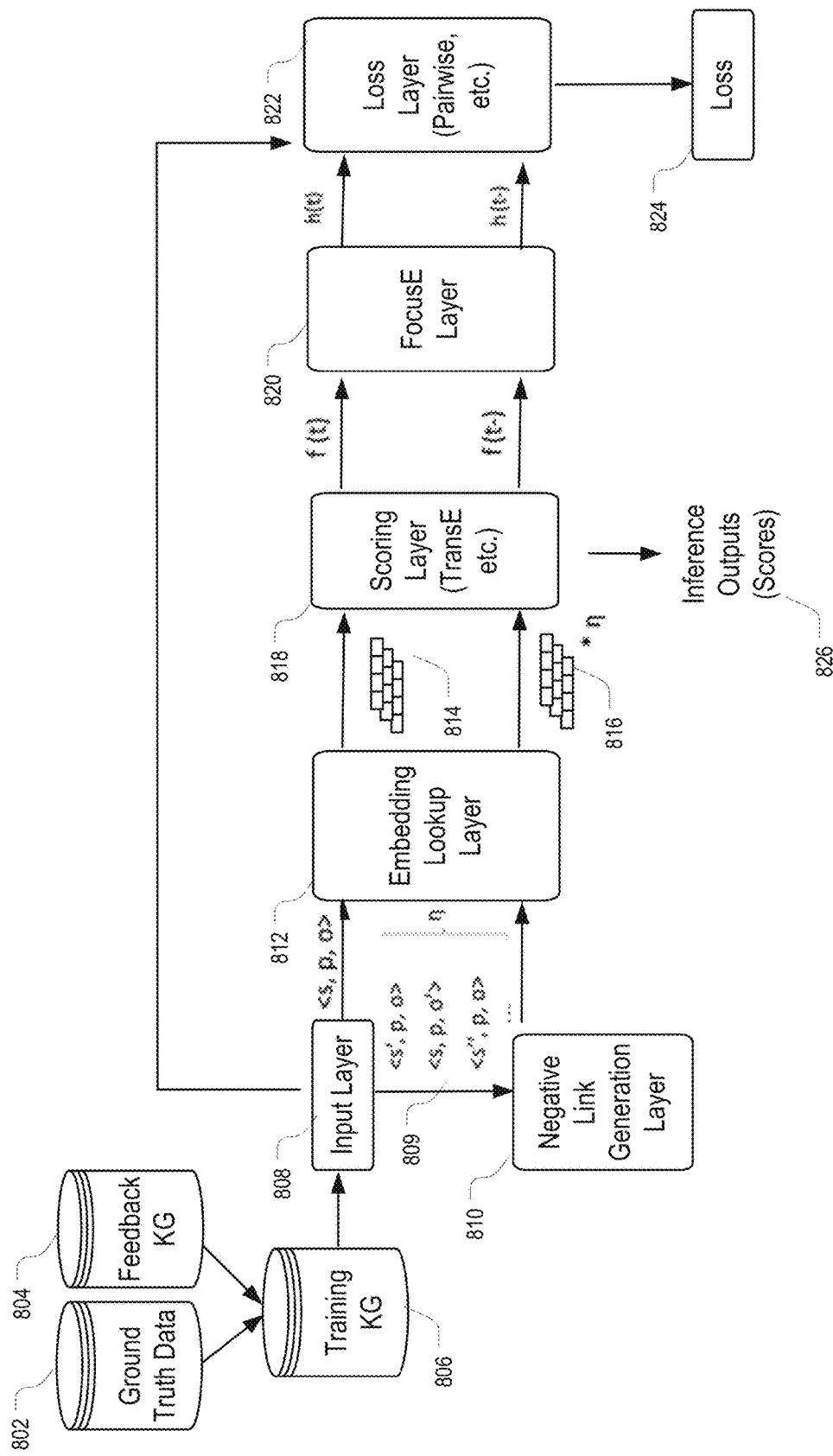
FIG. 8 illustrates an example focused training process for embedding generation of a combined ground truth knowledge graph and a feedback knowledge graph.

FIG. 8 further shows an example implementation of the graph machine learning circuitry 708 of FIG. 7. As shown in FIG. 8, the graph machine learning circuitry 708 may be trained and configured to convert one or more input knowledge graphs including their nodes and edges into embedding vectors in a trained embedding space of multiple dimensions. In the example of FIG. 8, the embedding generation and training process may be achieved using an input layer 808, a negative link generation layer 810, an embedding lookup layer 812, a scoring layer 818, a focusE layer 820 (alternatively referred to as scaling layer), and a loss generation layer 822. Further details of data and logic follow in these various layers are described below.

In FIG. 8, the links in the one or more input knowledge graphs from a training KG 806 may be fed as triples <s, p, o> to the input layer 808 (where s represents the subject of a triple, p represents the predicate of the triple, and o represents the object of the triple). The triples as extracted from the knowledge graphs are true triples. The negative link generation layer 810 may use, for example, a uniform negative generation strategy by corrupting either the subject or the object of the triples and replacing it with one of the uniformly randomly chosen entities in the knowledge graph. Example negative triples are shown by 809. The entities in the negative triples indicated with apostrophe represent randomly replaced elements in the original true triples. These triples are negative because they do not exist in the input knowledge graphs. The negative triples may be alternatively referred to as corrupted triples.

The embedding lookup layer 812 then determines the embeddings of the true and corrupted triples and passes these embeddings to the scoring layer 818. The scoring layer 818 scores the triples using a scoring function such as TransE, DistMult, and the like. The scoring layer 818 generates the scores for the positive triples as f(t) and scores for corrupted or negative triples as f(t−).

In some other example implementations not shown in FIG. 8, the scores for the positive and negative triples f(t) and f(−t) as generated by the scoring layer 818 may be directed provided to the loss layer 822. The loss layer 822 may be configured to aim at increasing a margin or separation between the scores of positive and negative triples. For example, it may be configured with model parameters to make the scores of positive triples close to 1 and scores of negative corrupted triples close to 0. In this way the model may be optimized and the embeddings may be trained. At inference time, we the scores for hypothesized triples may be extracted at the scoring layer. A high score may indicate that the model is highly confident that the hypothesized link exists.

In the example implementation of FIG. 8, the FocusE layer may be included and implemented to further extend the architecture to deal with the feedback KG 804 that are generated from user feedback. The feedback of the user 721 and the rules in the rules database 720 in FIG. 7 may be used for generation of the feedback Knowledge graph 710 of FIG. 7 or 804 of FIG. 8 which may be further used in retraining the graph machine learning model. This new knowledge graph may be entirely built using the feedback from the user, and the edges of this KG may be assigned a numeric attribute which indicates the confidences of the user. If the users are highly confident of the edge or have given mostly positive feedback to the edge, then it is assigned a confidence close to 1. If the users are not very confident or have assigned mostly a negative feedback, then the edge is assigned a score close to zero. The feedback knowledge graph 804 so constructed may be merged with the original KG 802 for embeddings training. All the edges in the original knowledge graph as part of the training knowledge graph 806 are assigned a confidence of 1, since these edges are ground-truth and factually-correct edges. Now a single large KG is obtained which has the original Ground truth graph and which also incorporates the user feedback knowledge graph with weighted edges. Example summary of scoring of the edges in the training KG may be as follows:

close to 1: for the content of the feedback knowledge graph corresponding to positive feedback (proportional to the confidence)

equal to 1: for all the content of the ground truth Knowledge Graph close to 0: for the content of the feedback knowledge graph corresponding to negative feedback (proportional to the confidence)

In the example approach of FIG. 8 that leverages the FocusE layer 820, the two input knowledge graphs provide different weights to the edges. This combined KG may be trained using the FocusE layer 820 in FIG. 8. The FocusE layer 820 may be a plug-in layer between the scoring layer 818 and the loss layer 822, as shown in FIG. 8. It uses the confidences on the triples in the combined training KG and alters the scores output by the scoring layer 818, such that the model focuses more on the triples with high confidence. In this manner the model would give higher focus to ground-truth triples and to feedback triples which have high confidences.

Turning to the rule extraction circuitry 718 of FIG. 7, this component may receive as an input the feedback of the user 721. As shown in FIG. 7 and described above, this feedback may either be negative, indicating that the predicted link is wrong, and optionally with explanation, or be positive, confirming that the predication was accurate and likely valid.

To illustrate the workings of the rule extraction circuitry 718 of FIG. 7, it is assumed as an example of a case referred to as "caseA" about a small company "companyA". For this example, the user may have received two example triple predictions for feedback:

<Technical upgrade for bottle necks, deployed on, caseA>
<Installation of IoT devices on the supply chain, deployed on, caseA>

Further assuming that the first predicted triple is associated with a positive user feedback whereas the second predicted triple is associated with a negative user feedback indicating the second predicted triple as being erroneous.

For rule extraction in the positive feedback situation, where a user validates a link prediction, it is assumed that an explanation is also available for the prediction of the link and is provided by a subsystem for generating explanation. In the example above, the user will be provided with a predicted link or triple <Technical upgrade for bottle necks, deployed on, caseA> and an explanation showing cases similar to that one and where this predicted link holds true. Assuming for this example that the company size is the deciding factor, a positive rule may thus be generated as following:

```
IF {
    <? case, is about, ?company>
    <? company, has size, "small">
} THEN {
    <Technical upgrade for bottle necks, deployed on, ?case>
}
```

For the negative feedback, a similar approach may be followed. The user may be invited to flag the erroneous prediction and what is wrong in the reasoning process which lead to it. It may be assumed that here in this example too it is the size of the company that was the deciding factor. This feedback may be turned into a rule similarly to the positive feedback:

```
IF {
    <? case, is about, ?company>
    <? company, has size, "small">
} THEN {
    <Installation of IoT devices on the supply chain, deployed on, ?case>
}
```

It is noted that in both cases different users may pick some other key factors for the reasoning process. For example, if both the size and the location of the company as key to the predictions are known, a given user may validate size as the main feedback factor whereas the other may pick location. Another user may as well provide a set of criteria on his own.

As further shown in FIG. 7, the rules extracted for positive or negative feedback may be stored in the rule database 720. The rules may be indicated as being associated with particular users. The rules stored in the rules database 720 may be further used to extract general consensus expressed therein, as described further below.

As further shown in FIG. 7 and generally described above, the feedback KG generation circuitry 712 may be configured to generate the feedback knowledge graph 710. Further details of the workings of the feedback KG generation circuitry 712 are provided below.

In some example implementations, once the feedback has been received from the users on predicted links, and rules have been extracted from these triples, the next stage is the generation of a feedback knowledge graph 710. The feedback knowledge graph 710, for example, may include triples derived from the feedback rules in the rules database 720. These rules, as described above, may have been constructed from triples which received either positive or negative feedback, and are referred to as positive rules and negative rules, respectively.

For each rule in the rules database 720, instances of triples may be generated using these rules. Some of the triples so generated may be in the ground truth graph already. Confidences for these generated triples may be assigned based on 4 example cases below:

Case 1 where the rule is positive and a large subset of the triples are in the ground truth knowledge graph: the triples generated using this rule are assigned a very high confidence, since the ground truth triples corroborates with the rules.

Case 2 where the rule is positive and a very small subset of the triples are in the ground truth knowledge graph: the triples generated using this rule are assigned a confidence slightly higher than but close to 0.5, since the ground truth knowledge graph doesn't corroborate with the rule. This could be a case where user is trying to give feedback in a malicious way to poison the graph.

Case 3 where the rule is negative and a very small subset of the triples are in the ground truth knowledge graph: the triples generated using this rule are assigned a confidence close to 0, since the ground truth triples corroborates with the rules.

Case 4 where the rule is negative and a large subset of the triples are in the ground truth knowledge graph: the triples generated using this rule are assigned a confidence slightly lower than but close to 0.5, since the ground truth knowledge graph doesn't corroborate with the rule. This could be a case where user is trying to give feedback in a malicious way to poison the graph.

The confidences mentioned above are assigned to unseen triples only—not to the ground truth triples, since ground truth triples are facts and have a confidence of 1. In some example implementations, the confidence may also be impacted by the number of rules generating the same triples.

One advantage of this approach is that a large feedback KG may be generated from a very few sets of rules, which can be used in addition to the GT graph as shown in FIG. 8. In addition, the rules may be incorporated in the embedding learning approach using the FocusE model by assigning confidences to the triples.

Returning to the consensus extraction circuitry 714 of FIG. 7, as described above, this component may be configured to turn individual feedback elements into a set of statements which may be used to impact the ground truth knowledge graph. For this to be allowed, a certain level of confidence must be reached as this knowledge graph as modified is likely to also be consumed by other AI and Human users. The consensus extraction circuitry 714 receives the rules in the rules database 720 and generates as an output a set of triples for feeding to the ground truth database 706. Contrary to the generation of triples for the feedback knowledge graph 710, focus of the consensus extraction circuitry 714 may be on the exact links that have been validated by the users, rather than all the edges which could be derived from the rules. In some implementations, only the positive rules may be focused on, as the ground truth knowledge graph is made of positive statements only.

In some example implementations, when processing the rules for the generation of the consensus, two different outcomes may be focused on. The first one may be the addition of new ground truth data to be leveraged globally. This facilitates building up a collective knowledge base over time. The second may be the correction of the data mapping process 704 in the event where the feedback would flag an error in the data mapping. This would streamline data processing between knowledge scientists and machine learning operators.

As shown in FIG. 7, the input to the consensus extraction circuitry 714 is the set of positive rules and the output of the consensus extraction circuitry 714 is a set of triples to be added to the ground truth knowledge graph. Two objectives for the definition and inclusion of the consensus data into the ground truth database 706 may be defined:

Compatibility: this set of triples should be compatible with what is present in the ground truth, rather that stating radically different opinions.

Agreement: the set of triples need to reflect an agreement reached amongst a set of individual feedback elements.

In some example implementations, data processing goes as follow:

a. For each rule, a set of triples inferred by the "THEN" clause above may be generated. The rule is then assigned a level of confidence proportional to the number of time generated triples are found in the ground truth graph (as a measure of compatibility) and the number of times the same triples are generated via different rules (as a measure of agreement).

b. The triples generated by each rule are then weighted according to the relative confidence in the rule. Those already in ground truth knowledge graph are discarded.

c. Remaining triples above a given overall confidence threshold are then added to the ground truth knowledge graph.

As further shown in FIG. 7, the consensus extraction circuitry may be configured to provide warning signal 715. For example, it can be found that, in some situations, a negative feedback rules may generate triples directly incompatible with the ground truth data. Because of the data mesh context, this input data may have come from a set of data sources and goes through a mapping process that converts its input format into a knowledge graph format. The consensus extracted from the feedback rules may lead to identifying issues in this mapping process.

Below shows a concrete example by assuming an input provided as the following table

| Use case | Company | Solution | Challenge | Team size |
| --- | --- | --- | --- | --- |
| Project1 | CorpA | Installation of IoT devices on the supply chain | Low production efficiency | small |
| Project2 | CorpB | Installation of IoT devices on the supply chain | Low production efficiency | small |

Figure 9:
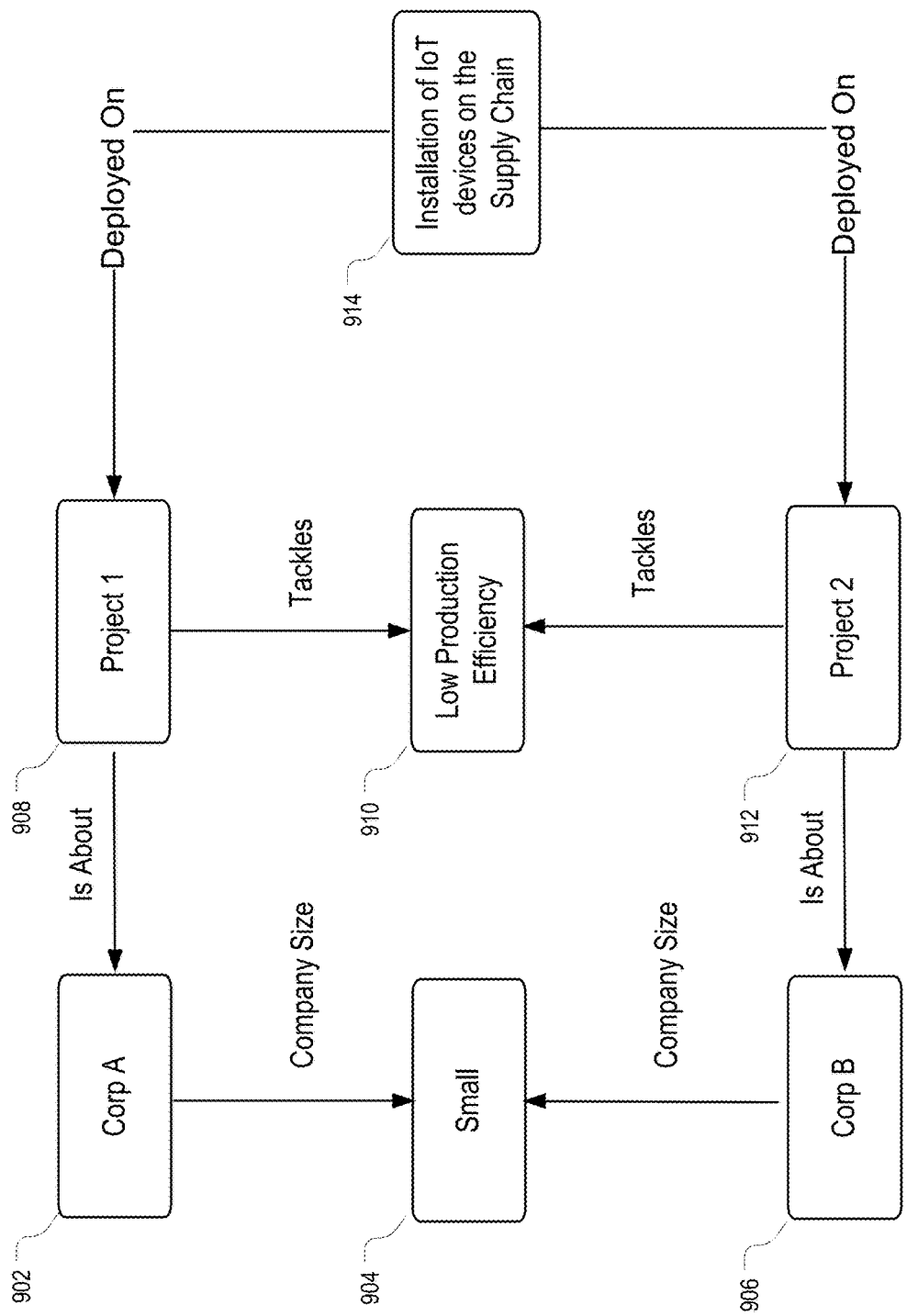
FIG. 9 illustrates an example portion of a knowledge graph.
Figure 10:
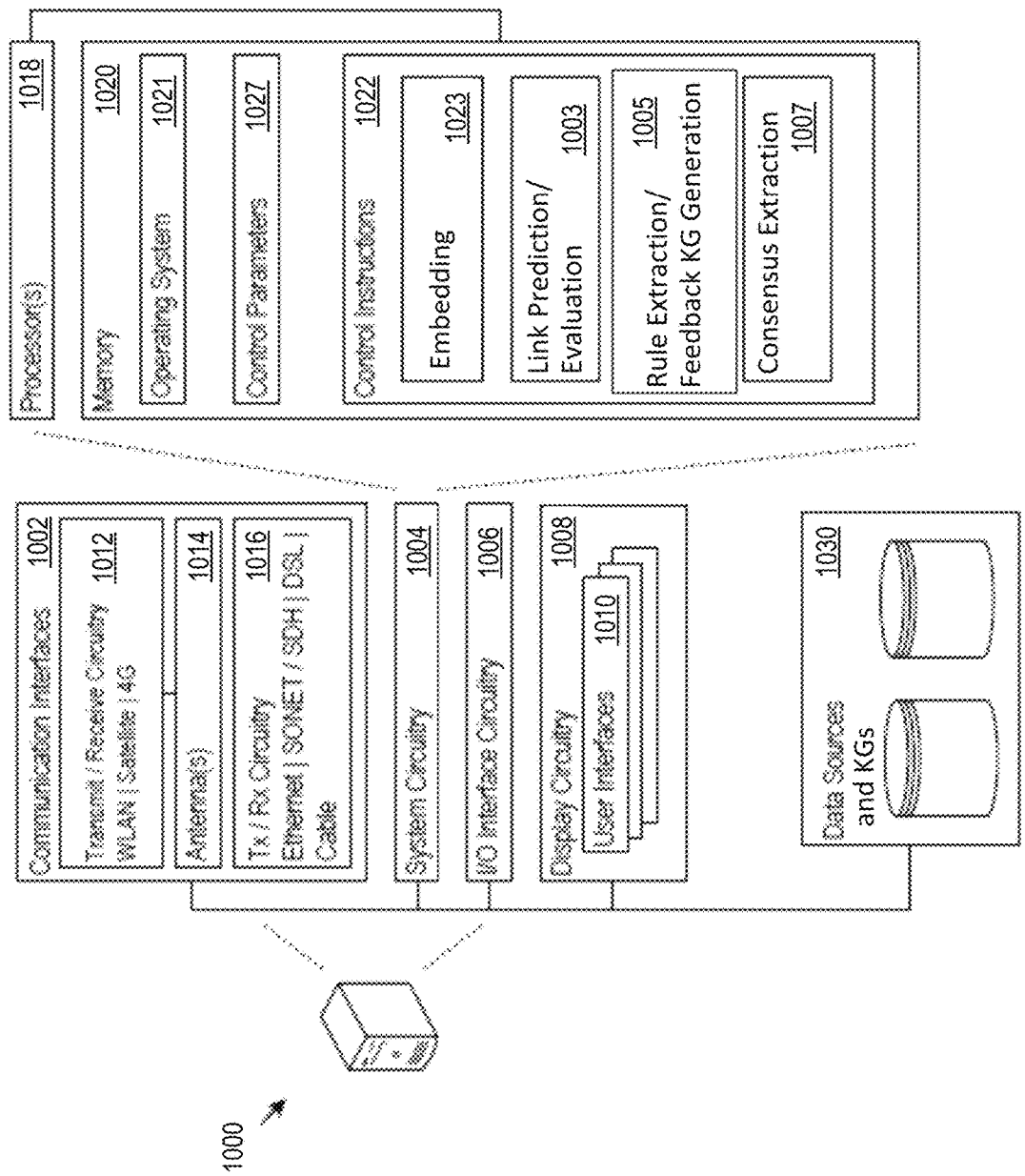
FIG. 10 is a block diagram illustrating an example architecture for a computer device for implementing the exemplary knowledge graph prediction systems and methods shown in FIGS. 1-9.

These example simple datasets report two different use cases where "Installation of IoT devices on the supply chain" has been successfully applied to the challenge "Low production efficiency". There are two other columns to indicate the name of the client and the size of the team who worked on the projects of deploying the solutions. Assuming that the mapping process has been programmed with an error leading to a capture of the team size as the company size, that would result in a knowledge graph portion shown in FIG. 9 being derived from the table. Specifically, FIG. 9 shows that CorpA 902 and CorpB 906 both have a small size 904, that Project1 908 and Project2 912 are for or about CorpA 902 and CorpB 906, respectively, that the solution "installation of IoT devices on the supply chain" 914 is deployed in both Project1 908 and Project2 912, and both tackle the challenge of "low production efficiency" 910.

Such derived knowledge graph is likely to drive the machine learning to suggest this pairing of solution and challenge to more small companies. Considering the above negative feedback consensus of "Installation of IoT devices on the supply chain" being never applicable to small companies, it can be detected that this portion of the derived knowledge graph is in direct contradiction with the consensus. A further investigation, manually or automatically done, easily leads to the mapping between the column "team size" and the edge "company size" as the culprit. This information may thus be raised as an alarm or warning signal. The alarm is then consumed by the entity governing the data mapping process, which may depend on the specifics of the data mesh implementation.

As shown above, an example method performed by a computing device for knowledge graph link set prediction is disclosed. The method may include ingesting a knowledge graph comprising a plurality of nodes and a plurality of ground-truth edges to generate a current knowledge graph; initiating a predicted link set associated with the current knowledge graph. The method further include iteratively performing, until an iteration stoppage condition is met: converting the current knowledge graph into embedding vectors in a multi-dimensional embedding space; generating a set of single predicted edges, based on the embedding vectors and a query, characterized by normalized linkage scores; ranking the set of single predicted edges based on the normalized linkage scores in a ranking order; adding at least one single predicted edge of the set of single predicted edges according to the ranked order to the predicted link set; and adding the at least one single predicted edge of the set of single predicted edges to expand the current knowledge graph. The method further include, after the iteration stoppage condition is met, automatically generating a plain text description of the predicted link set.

In the example method above, the plurality of nodes may include at least a set of diseases and a set of treatments; and the plurality of ground-truth edges may include known linkages between the set of diseases and the set of treatments.

In any one of the example methods above, the plurality of nodes may include at least a set of operational challenges and a set of actionable solutions associated with an enterprise operation; and the plurality of ground-truth edges may include known linkages between the set of actionable solutions and the set of operational challenges.

In any one of the example methods above, the plurality of nodes and the plurality of ground-truth edges further may include nodes and edges extracted from a plurality of knowledge graphs associated with a plurality of domains of the enterprise operation.

In any one of the example methods above, at most one top-ranked single predicted edge is added to the predicted link set and the current knowledge graph in each iteration.

In any one of the example methods above, the iteration stoppage condition may include a ratio between the normalized linkage scores of a second ranked single predicted edge and the top ranked top ranked single predicted edge among the set of single predicted edges being below a threshold value.

In any one of the example methods above, the threshold value is predetermined or adaptively determined. In some examples, the threshold value may be 0.5 or lower.

In any one of the example methods above, a predetermined number of top-ranked single predicted edges among the set of single predicted edges are added to the predicted link set and the current knowledge graph in each iteration.

In any one of the example methods above, the set of single predicted edges may be generated by evaluating and selecting from a set of hypothetical links.

In any one of the example methods above, the hypothetical links may be generated as all possible pairing between the set of actionable solutions and enterprise operational challenges extracted from the query.

In any one of the example methods above, the plain text description of the predicted link set may be constructed based on a history of the iterations for expansion of the predicted link set.

In some other example implementations, a system or device is disclosed. The system or device may include at least one memory for storing computer instructions and a processing circuitry in communication with the at least one memory. The processing circuitry, when executing the computer instructions, is configured to perform any one of the example methods above.

Finally, the figure below illustrates an exemplary architecture of a computing device 1000 on which the various computing components of the system described above. The computing device 1000 may include communication interfaces 1002, system circuitry 1004, input/output (I/O) interface circuitry 1006, and display circuitry 1008. The graphical user interfaces (GUIs) 1010 displayed by the display circuitry 608 may be used to receive user commands/input and to display various outputs. The GUIs 1010 may be displayed locally using the display circuitry 1008, or for remote visualization, e.g., as HTML, JavaScript, audio, and video output for a web browser running on a local or remote machine.

The GUIs 1010 and the I/O interface circuitry 1006 may include touch sensitive displays, voice or facial recognition inputs, buttons, switches, speakers and other user interface elements. Additional examples of the I/O interface circuitry 1006 includes microphones, video and still image cameras, headset and microphone input/output jacks, Universal Serial Bus (USB) connectors, memory card slots, and other types of inputs. The I/O interface circuitry 1006 may further include magnetic or optical media interfaces (e.g., a CDROM or DVD drive), serial and parallel bus interfaces, and keyboard and mouse interfaces.

The communication interfaces 1002 may include wireless transmitters and receivers ("transceivers") 1012 and any antennas 1014 used by the transmit and receive circuitry of the transceivers 1012. The transceivers 1012 and antennas 1014 may support WiFi network communications, for instance, under any version of IEEE 802.11, e.g., 802.11n or 802.11ac, or other wireless protocols such as Bluetooth, WiFi, WLAN, cellular (4G, LTE/A). The communication interfaces 1002 may also include serial interfaces, such as universal serial bus (USB), serial ATA, IEEE 1394, lighting port, $I^2C$, slimBus, or other serial interfaces. The communication interfaces 1002 may also include wireline transceivers 1016 to support wired communication protocols. The wireline transceivers 1016 may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

The system circuitry 1004 may include any combination of hardware, software, firmware, APIs, and/or other circuitry. The system circuitry 1004 may be implemented, for example, with one or more systems on a chip (SoC), application specific integrated circuits (ASIC), microprocessors, discrete analog and digital circuits, and other circuitry. The system circuitry 1004 may implement any desired functionality of the disclosed system and its various components. As just one example, the system circuitry 1004 may include one or more instruction processor 1018 and memory 1020.

The memory 1020 may be implemented as a non-transitory memory circuit and may store, for example, control instructions 1022 for implementing the various functions described above, as well as an operating system 1021. In one implementation, the processor 1018 executes the control instructions 1022 and the operating system 1021 to carry out any desired functionality of the various components above, including but not limited to the embedding functions 1023, link prediction and evaluation functions 1003, rule extraction and feedback knowledge graph generation functions 1005, and consensus extraction functions 1007.

The computing device 1000 may further include various data sources and databased such as knowledge graphs 1030, or may be in communication with external data sources. Each of the databases that are included in the data sources and knowledge graphs 1030 may be accessed by the various component of the disclosed system and its components.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

Many other modifications of the implementations above may be made to adapt a particular situation or material to the teachings without departing from the scope of the current disclosure. Therefore, it is intended that the present methods and systems not be limited to the particular embodiments disclosed, but that the disclosed methods and systems include all embodiments falling within the scope of the appended claims.

We claim:

1. A system comprising at least one memory for storing computer instructions and a processing circuitry in communication with the at least one memory, the processing circuitry, when executing the computer instructions, is configured to:
ingest a knowledge graph comprising a plurality of nodes and a plurality of ground-truth edges to generate a current knowledge graph;
initiate a predicted link set associated with the current knowledge graph;
iteratively, until an iteration stoppage condition is met:
convert, by a graph machine learning model, the current knowledge graph into embedding vectors in a multidimensional embedding space, wherein the graph machine learning model includes:
a scoring layer configured to score positive triples and negative triples of the current knowledge graph;
a plug-in layer configured to alter the scores output by the scoring layer based on confidence of edges of a feedback knowledge graph generated based on user feedback on previous predicted link set and explanation on the previous predicted link set, and
a loss layer configured to aim at increasing margin between the scores of the positive triples and the negative triples based on output of the plug-in layer, for optimizing parameters of the graph machine learning model in generating the embedding vectors;
generate a set of single predicted edges, based on the embedding vectors and a query, characterized by normalized linkage scores;
rank the set of single predicted edges based on the normalized linkage scores in a ranking order;
determine whether the predicted link set is empty;
add at least one single predicted edge of the set of single predicted edges according to the ranked order to the predicted link set, based on the predicted link set is empty;
evaluate a criterion for addition of the at least one single predicted edge to the predicted link set, based on the predicted link set is non-empty;
add the at least one single predicted edge to the predicted link set based on the evaluation of the criterion; and
add the at least one single predicted edge of the set of single predicted edges to expand the current knowledge graph; and
after the iteration stoppage condition is met, automatically generate a plain text description of the predicted link set, wherein the plain text description of the predicted link set is generated based on a history of the iterations for expansion of the predicted link set.

2. The system of claim 1, wherein:
the plurality of nodes comprise at least a set of diseases and a set of treatments; and
the plurality of ground-truth edges comprise known linkages between the set of diseases and the set of treatments.

3. The system of claim 1, wherein:
the plurality of nodes comprise at least a set of operational challenges and a set of actionable solutions associated with an enterprise operation; and
the plurality ground-truth edges comprise known linkages between the set of actionable solutions and the set of operational challenges.

4. The system of claim 3, wherein the plurality of nodes and the plurality of ground-truth edges further comprise nodes and edges extracted from a plurality of knowledge graphs associated with a plurality of domains of the enterprise operation.

5. The system of claim 3, wherein at most one top-ranked single predicted edge is added to the predicted link set and the current knowledge graph in each iteration.

6. The system of claim 5, wherein the iteration stoppage condition comprises a ratio between the normalized linkage scores of a second ranked single predicted edge and the top ranked single predicted edge among the set of single predicted edges being below a threshold value.

7. The system of claim 6, wherein the threshold value is predetermined.

8. The system of claim 7, wherein the threshold value is 0.5 or lower.

9. The system of claim 6, wherein the threshold value is adaptively determined.

10. The system of claim 6, wherein a predetermined number of top-ranked single predicted edges among the set of single predicted edges are added to the predicted link set and the current knowledge graph in each iteration.

11. The system of claim 3, wherein the set of single predicted edges are generated by evaluating and selecting from a set of hypothetical links.

12. The system of claim 11, wherein the set of hypothetical links are generated as all possible pairing between the set of actionable solutions and enterprise operational challenges extracted from the query.

13. A method performed by a computing device for knowledge graph link set prediction, comprising:
ingesting a knowledge graph comprising a plurality of nodes and a plurality of ground-truth edges to generate a current knowledge graph;
initiating a predicted link set associated with the current knowledge graph;
iteratively, until an iteration stoppage condition is met:
converting, by a graph machine learning model, the current knowledge graph into embedding vectors in a multi-dimensional embedding space, wherein the graph machine learning model includes:
a scoring layer configured to score positive triples and negative triples of the current knowledge graph;

a plug-in layer configured to alter the scores output by the scoring layer based on confidence of edges of a feedback knowledge graph generated based on user feedback on previous predicted link set and explanation on the previous predicted link set; and a loss layer configured to aim at increasing margin between the scores of the positive triples and the negative triples based on output of the plug-in layer, for optimizing parameters of the graph machine learning model in generating the embedding vectors;

generating a set of single predicted edges, based on the embedding vectors and a query, characterized by normalized linkage scores;

ranking the set of single predicted edges based on the normalized linkage scores in a ranking order;

determining whether the predicted link set is empty;

adding at least one single predicted edge of the set of single predicted edges according to the ranked order to the predicted link set, based on the predicted link set is empty;

evaluating a criterion for addition of the at least one single predicted edge to the predicted link set, based on the predicted link set is non-empty;

adding the at least one single predicted edge to the predicted link set based on the evaluation of the criterion; and adding the at least one single predicted edge of the set of single predicted edges to expand the current knowledge graph; and after the iteration stoppage condition is met, automatically generating a plain text description of the predicted link set, wherein the plain text description of the predicted link set is generated based on a history of the iterations for expansion of the predicted link set.

14. The method of claim 13, wherein:
the plurality of nodes comprise at least a set of diseases and a set of treatments; and
the plurality of ground-truth edges comprise known linkages between the set of diseases and the set of treatments.

15. The method of claim 13, wherein:
the plurality of nodes comprise at least a set of operational challenges and a set of actionable solutions associated with an enterprise operation; and
the plurality of ground-truth edges comprise known linkages between the set of actionable solutions and the set of operational challenges.

16. The method claim 15, wherein the plurality of nodes and the plurality of ground-truth edges further comprise nodes and edges extracted from a plurality of knowledge graphs associated with a plurality of domains of the enterprise operation.

17. The method of claim 15, wherein at most one top-ranked single predicted edge is added to the predicted link set and the current knowledge graph in each iteration.

18. The method of claim 17, wherein the iteration stoppage condition comprises a ratio between the normalized linkage scores of a second ranked single predicted edge and the top ranked top ranked single predicted edge among the set of single predicted edges being below a threshold value.

19. The method of claim 18, wherein the threshold value is predetermined or adaptively determined.

* * * * *